US009481467B2

(12) United States Patent
Oleson

(10) Patent No.: US 9,481,467 B2
(45) Date of Patent: Nov. 1, 2016

(54) MODULAR AIRCRAFT FLOOR TRACK ADAPTER SYSTEM

(71) Applicant: B/E Aerospace, Inc., Wellington, FL (US)

(72) Inventor: Michael L. Oleson, Parkland, FL (US)

(73) Assignee: B/E Aerospace, Inc., Wellington, FL (US)

(*) Notice: Subject to any disclaimer, the term of this patent is extended or adjusted under 35 U.S.C. 154(b) by 88 days.

(21) Appl. No.: 14/519,756

(22) Filed: Oct. 21, 2014

(65) Prior Publication Data

US 2015/0108273 A1 Apr. 23, 2015

Related U.S. Application Data

(60) Provisional application No. 61/893,350, filed on Oct. 21, 2013.

(51) Int. Cl.
*B64D 11/06* (2006.01)
*B64C 1/20* (2006.01)
*B64C 1/18* (2006.01)

(52) U.S. Cl.
CPC ............ *B64D 11/0696* (2013.01); *B64C 1/18* (2013.01); *B64C 1/20* (2013.01)

(58) Field of Classification Search
CPC ........ B64D 11/0696; B64C 1/18; B64C 1/20
See application file for complete search history.

(56) References Cited

U.S. PATENT DOCUMENTS

2010/0314494 A1* 12/2010 Gasser ............... B64D 11/0696
244/131
2011/0068226 A1 3/2011 Baatz et al.
2012/0091273 A1* 4/2012 Barmichev ............... B64C 1/20
244/118.1

FOREIGN PATENT DOCUMENTS

| DE | 1102008007403 A1 | 8/2007 |
| FR | 2891239 A1 | 3/2007 |
| FR | 2988686 A1 | 10/2013 |
| GB | 706614 A | 3/1954 |
| JP | 2007-221688 A | 8/2007 |
| JP | 2011-234088 A | 11/2011 |
| JP | 2012-074866 A | 4/2012 |

OTHER PUBLICATIONS

International Search Report (Japanese and English translation) of corresponding International Application No. PCT/ JP2013/077611; received Jan. 20, 2015; 5 pages.
International Preliminary Report and Written Opinion of corresponding International No. PCT/US2014/061552; mailed May 6, 2016; 9 pages.

* cited by examiner

*Primary Examiner* — Christopher P Ellis
*Assistant Examiner* — Jessica Wong
(74) *Attorney, Agent, or Firm* — Shumaker, Loop & Kendrick, LLP

(57) ABSTRACT

A modular floor track adapter system including a plurality of adapter plates laterally sized to span existing aircraft floor beams, each of the plurality of adapter plates shaped to interlock with an adjacent adapter plate in a side-by-side arrangement and including a series of holes for attaching seat track crown sections and panel attachment tabs for securing an aircraft floor panel thereto.

13 Claims, 4 Drawing Sheets

MODULAR AIRCRAFT FLOOR TRACK ADAPTER SYSTEM

CROSS-REFERENCE TO RELATED APPLICATION

This application claims priority from U.S. Patent Application Ser. No. 61/893,350 filed Oct. 21, 2013, the entirety of which is incorporated by reference herein.

TECHNICAL FIELD AND BACKGROUND OF THE INVENTION

The present invention relates generally to a system by which seat tracks can be added between existing floor beam locations in an aircraft, and more particularly, to a modular floor track system including transversely mounted adapter plates adapted to span the existing floor beam locations, wherein sections of seat track are added to the adapter plates to provide an attachment point for attaching seats to configure an aircraft interior.

Large commercial aircraft cabins are commonly configured to accept seating designed specifically to attach to the existing longitudinal floor tracks provide within the aircraft. These tracks run primarily parallel to the aircraft centerline over the length of the cabin. Multiple floor tracks are spaced across the aircraft floor to provide attachment locations primarily for seating products and furniture. The lateral spacing of the floor tracks is often unique to the aircraft type. Commercial-type seats are generally multi-place seats ranging from double seats to seats made for up to five passengers. These commercial-type seats are attached directly to the existing floor tracks using industry standard attachment fittings.

Commercial aircraft are often configured for executive use. Individuals, corporations, fractional ownership companies, and others configure the cabins in a different manner than for commercial use. These executive cabins utilize single and multi-place seats, side-facing divans (e.g., sofas), and other specialty seating for added comfort. In addition, interior components (e.g., bulkheads, credenzas) are added to configure the cabin in a custom manner. As such, the executive seating and interior components often have different lateral leg spacing that does not coincide with the standard/existing seat track locations. Moreover, some aircraft do not have seat tracks, and provide only longitudinal floor beams that require all attachments to utilize special attachment fittings to attach to these floor beams. This attachment scheme requires that all seats be designed or redesigned to utilize these fittings, often warranting new certification.

Therefore, in order to facilitate installation flexibility and allow custom seat, furniture, bulkhead, etc. placement within the aircraft cabin, what is needed is a system that makes use of the existing longitudinal beams in the aircraft to provide additional attachments points for attaching the seats, furniture, bulkheads, etc.

BRIEF SUMMARY OF THE INVENTION

It is an object of the invention to provide a system by which seat tracks can be added in locations between standard (i.e., existing) floor beam locations in an aircraft cabin.

It is another object of the invention to provide a system including modular adapter plates of varying size adapted to interlock at and attach to the standard floor beam locations.

It is another object of the invention to provide a seat attachment system including modular adapter plates adapted to laterally span the existing floor beam locations.

It is another object of the invention to provide a modular seat track system including adapter plates adapted to span the standard floor beams, and local sections of seat track crown added to the adapter plates to provide attachment points for attaching the seats and other furniture to configure custom executive aircraft interiors.

It is another object of the invention to provide a seat attachment system wherein sections of track crown are added on top of adapter plates at the lateral spacing corresponding to predetermined executive seat leg spacing.

It is another object of the invention to provide a seat attachment system wherein executive seating can be installed where desired independent of the existing floor beam locations in an aircraft.

It is another object of the invention to provide a seat attachment system wherein the seats can be attached utilizing their existing track attachment fittings, obviating the need for equipping the seats with customized track fittings.

It is another object of the invention to provide a seat attachment system in which local bending strength can be added as necessary to increase the lateral and longitudinal bending strength either within a single adapter plate or across two adapter plates.

To achieve the foregoing and other objects and advantages, in a first embodiment the present invention provides a modular floor track adapter system including a plurality of adapter plates laterally sized to span existing aircraft floor beams, each of the plurality of adapter plates shaped to interlock with an adjacent adapter plate in a side-by-side arrangement, each of the plurality of adapter plates including a series of holes for attaching seat track sections thereto, and each of the plurality of adapter plates including attachment tabs for securing an aircraft floor panel thereto.

In another aspect, each of the plurality of adapter plates may include interlocking features along lateral edges thereof having openings therethrough for receiving fasteners for attaching the plurality of adapter plates to the existing aircraft floor beams.

In another aspect, the series of holes may open through at least one major face of each of the plurality of adapter plates.

In another aspect, the holes may extend through a thickness of each of the plurality of adapter plates.

In another aspect, the series of holes are arranged into parallel rows and parallel columns of holes across a respective length and width of each of the plurality of adapter plates.

In another aspect, the panel attachment tabs may be periodically arranged along a length of both front and rear edges of each of the plurality of adapter plates.

In another aspect, the system may further include sections of track crown adapted to attach to a top face each of the plurality of adapter plates.

In another aspect, the system may further include elongate channels adapted to attach to the underside of each of the plurality of adapter plates to resist adapter plate bending.

In another aspect, the panel attachment tabs may be recessed from a front face of each of the plurality of adapter plates.

In another aspect, the plurality of adapter plates may have the same length and varying widths.

According to another embodiment, the present invention provides a modular floor track adapter system adapted to be installed in locations between existing aircraft floor beams. The system includes a plurality of adapter plates laterally sized to span the existing aircraft floor beams, each of the plurality of adapter plates shaped to interlock with an adjacent adapter plate in a side-by-side arrangement, including a series of holes opening through a face thereof, and including panel attachment tabs for securing an aircraft floor panel thereto, and seat track adapted to attach to the face of each of the plurality of adapter plates by way of fasteners received through the seat track and series of holes.

In another aspect, each of the plurality of adapter plates may include interlocking features along lateral edges thereof having openings therethrough for receiving fasteners for attaching the plurality of adapter plates to the existing aircraft floor beams.

In another aspect, the series of holes may extend through a thickness of each of the plurality of adapter plates and may be arranged into parallel rows and parallel columns of holes across a respective length and width of each of the plurality of adapter plates.

In another aspect, the panel attachment tabs may be periodically arranged along a length of both front and rear edges of each of the plurality of adapter plates and are recessed from the face.

In another aspect, the system may further include elongate U-shaped channels adapted to attach to the underside of each of the plurality of adapter plates to resist adapter plate bending.

Embodiments of the invention can include one or more or any combination of the above features, aspects and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to the figures, a modular aircraft floor track adapter system configured to utilize seat track crown and conventional fasteners is disclosed herein. The system allows seating previously designed to attach to track crown to be utilized without having to redesign the seat and monument attachment hardware. The track system can also be used to install side-facing divans, other furniture and bulkheads. The system further allows monuments to be installed using existing track attachment hardware.

The system described herein allows interior designers arranging executive aircraft cabins to position executive seating and interior monuments using the system for track attachment. In a particular embodiment, track installation is available at the aircraft centerline and about every 5 cm laterally with the exception of some locations due to adapter plate to floor beam attachment. Existing floor panels can be straight-cut to facilitate adapter plate installation, and can be reattached utilizing tabs included on the adapter plates. The tab spacing on each adapter plate may be consistent for modification of the existing floor panels to attach to the adapter plates (i.e. panel insert installation). The attachment of the adapter plates to the existing floor beams may utilize a special blind fastener. The adapter plates generally have an interlace or interlocking design to allow seat track to be installed at the same longitudinal location between the existing floor beams. The system is modular in that specific adapter plates are added to laterally span the existing floor beams. Supports such as channels can be added laterally to enhance the bending strength of each adapter plate as required, and can be added longitudinally between adapters under the floor panels to react overturning moments.

Figure 1:
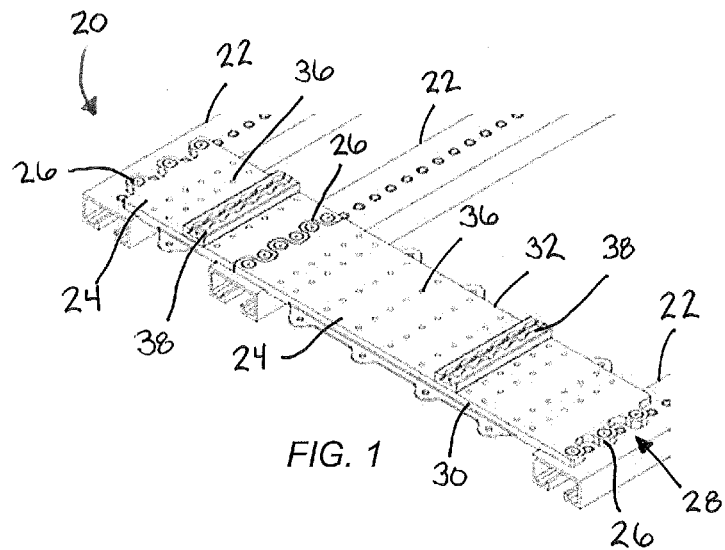
FIG. 1 is a perspective view of one embodiment of a modular floor track adapter system configured for installation in an aircraft cabin.
Figure 2:
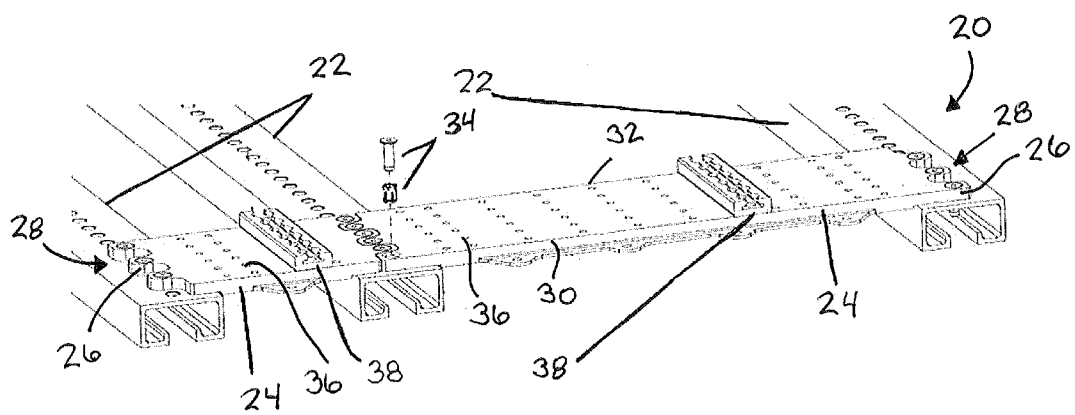
FIG. 2 is a perspective view of the system of FIG. 1 showing adapter plate attachment to the existing aircraft floor beams.

Referring to FIGS. 1 and 2, a portion of the modular aircraft floor track adapter system, referred to herein as the "system," is shown generally at reference numeral 20 from two different angles. The system 20 establishes a means by which seat track can be added in locations between the existing floor beam locations. Existing floor beams, also referred to herein as "standard floor beams," are shown at reference numeral 22, and run longitudinally the length of the cabin parallel or substantially parallel to one another and to the longitudinal centerline of the aircraft. Three floor beams 22 are shown in FIGS. 1 and 2, with the middle beam spaced closer to the left beam than the right beam. The distance between adjacent floor beams may vary, with distances between floor beams typically increasing in the outboard direction. As such, the lateral size of the adapter plates of the system may increase in the outboard direction to span the adjacent floor beams.

The existing floor beams 22 originally intended to directly attach the seats using conventional track fasteners that engage within the openings defined in the floor beams have been repurposed in the present invention to attach the adapter plates and provide support to the adapter plates from vertically below. Floor beams locations used to attach the adapter plates are therefore unavailable to directly attach the seats.

The system 20 generally includes a plurality of adapter plates 24 laterally sized to span the adjacent floor beams 22. The adapter plates 24 are shaped such that they interlock at the floor beam locations, thereby preventing translational movement between plates along the longitudinal direction of the aircraft. The adapter plates 24 include interlocking features 26 along their lateral edges 28 that allow two adapter plates to be installed side-by-side with their front and rear edges 30, 32 aligned. The lateral edges 28 of the adjacent adapter plates 24 interlock such that both plates are able to attach to the same floor beam 22. The alternating design of the interlocking features 26, which may take the form of sinusoidal, castellated or like features, allows each adapter plate 24 to align with and make use of alternating holes in the floor beam 22 to attach the adapter plates. The adapter plates 24 may be attached using fasteners 34, such as the exemplary fasteners shown in FIG. 2.

Each adapter plate 24 includes a series of holes 36 used to attach sections of seat track 38, also referred to herein as "track crown," to the top face of the adapter plates and between the floor beams 22. Known to those skilled in the art, seat track 38 can take various forms, but typically includes a series of equidistant circular openings spaced by smaller transverse openings. The seat track 38 may take the form of short sections having a length about equal or equal to the length to the adapter plates 24, with length being measured in the longitudinal direction of the aircraft, and attach to the adapter plates such that the seat tracks are parallel to the underlying longitudinal floor beams 22. One or more sections of seat track 38 may attach to each adapter plate 24 depending on the width of the adapter plate. The two adapter plates 24 shown in FIGS. 1 and 2 are arranged to form one continuous row spanning three floor beams 22, but could also be arranged to form two partial rows each spanning two beams. The location of the adapter plates 24 and seat tracks 38 is dependent upon the position of the seats and/or other components to be installed in the cabin.

Figure 3:
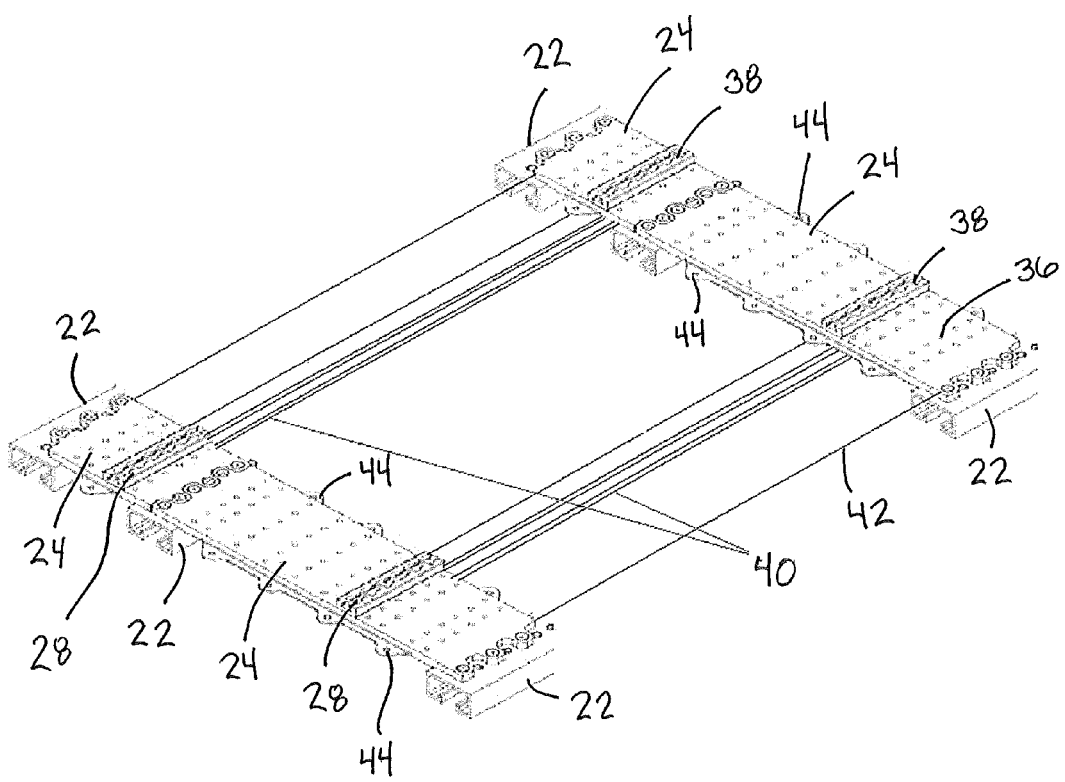
FIG. 3 is a perspective view of a portion of the floor of an aircraft cabin including floor beams, floor panels and the modular floor track adapter system according to the present invention.

Referring to FIG. 3, should the individual seat, furniture or interior component attached to the seat track 38 deliver interface loads that exceed the standard adapter plate bending strength, then sections of channel 40 can be added under the adapter plates to increase the location bending strength of the adapter plates. The channel 40, such as the U-shaped channel shown, can be added using the series of holes 36 in the adapter plates 24. Even if a piece of seat track 38 has been added, the fastener holding the seat track to the adapter plate 24 can be lengthened to also accept the channel running under the adapter plates. The added channel 40 shown interconnects two continuous, longitudinally adjacent rows of adapter plates 24, thus the channels run longitudinally to react moments. The channels 40 may further support floor panels 42, shown transparent in FIG. 3 for clarity, from vertically below.

Figure 4:
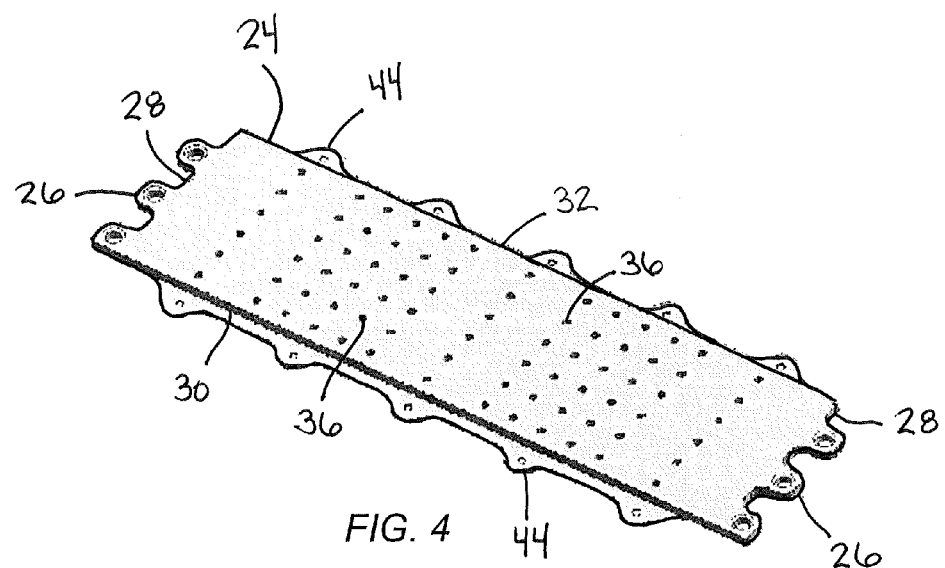
FIG. 4 is an isometric view of a single adapter plate of the modular floor track adapter system.

Referring to FIG. 4, each adapter plate 24 is a generally flat rectangular plate defining top and bottom major planar faces, a front edge 30, a rear edge 32, and left-side and right-side lateral edges 28. The left-side and right-side lateral edges 28 include the interlocking features 26 having openings therethrough as discussed above. Panel attachment tabs 44 are periodically arranged along the length of both the front and rear edges 30, 32 of the adapter plate for securing the floor panel 42 to the adapter plate. The number of panel attachment tabs 44 may depend on the width of the adapter plate 24 and desired spacing between panel attachment tabs 44. The panel attachments tabs 44 may be recessed from the top face of the adapter plate 24 such that top of the installed panel aligns flush with the top of the adapter plate, providing one continuous coplanar surface. The series of holes 36 are arranged in parallel rows and columns across the width and length of the adapter plate 24 in any desired number and spacing. The series of holes 36 may open through the top face of the adapter plate 24 or may extend through the entire thickness of the adapter plate.

Figure 5:
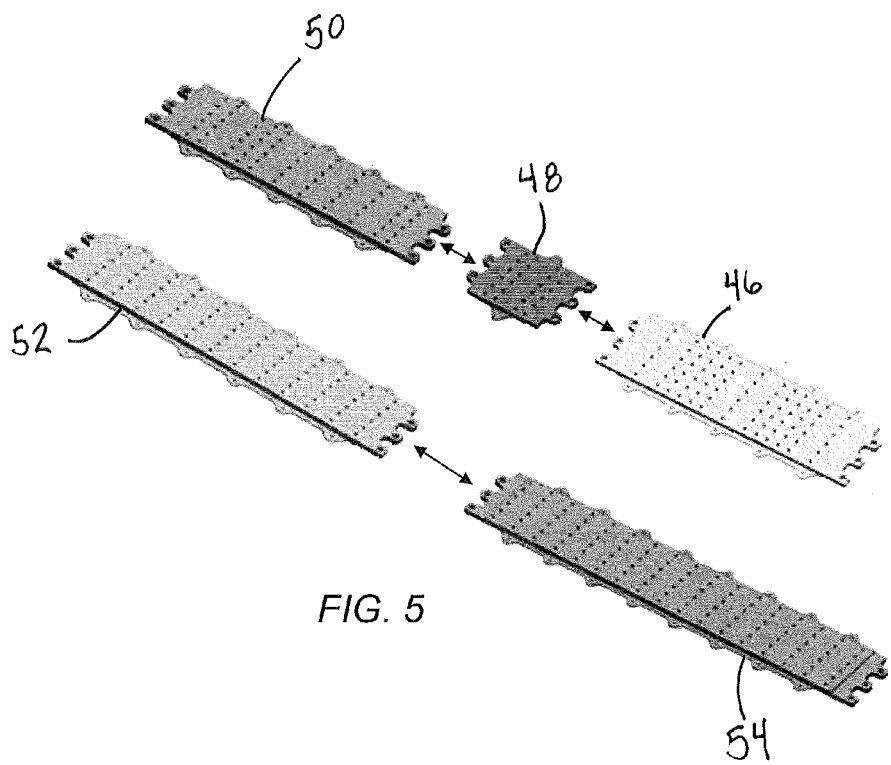
FIG. 5 illustrates various sizes of adapter plates configured to be arranged to span existing floor beam locations.

Referring to FIG. 5, the system may include adapter plates having varying widths sized to span the existing aircraft floor beams and spacing thereof. For example, the system 20 may include a center adapter plate 46, an inboard adapter plate 48 available in both left-handed and right-handed versions, a mid/inboard adapter plate 50 available in both left-handed and right-handed versions, a mid-outboard adapter plate 52 available in both left-handed and right-handed versions, and an outboard adapter plate 54 available in both left-handed and right-handed versions. The width and type of each adapter plate making up a system may differ depending on the floor beam layout of a particular aircraft. The length of each adapter plate may also be customized based on the length of seat track needed.

Figure 6:
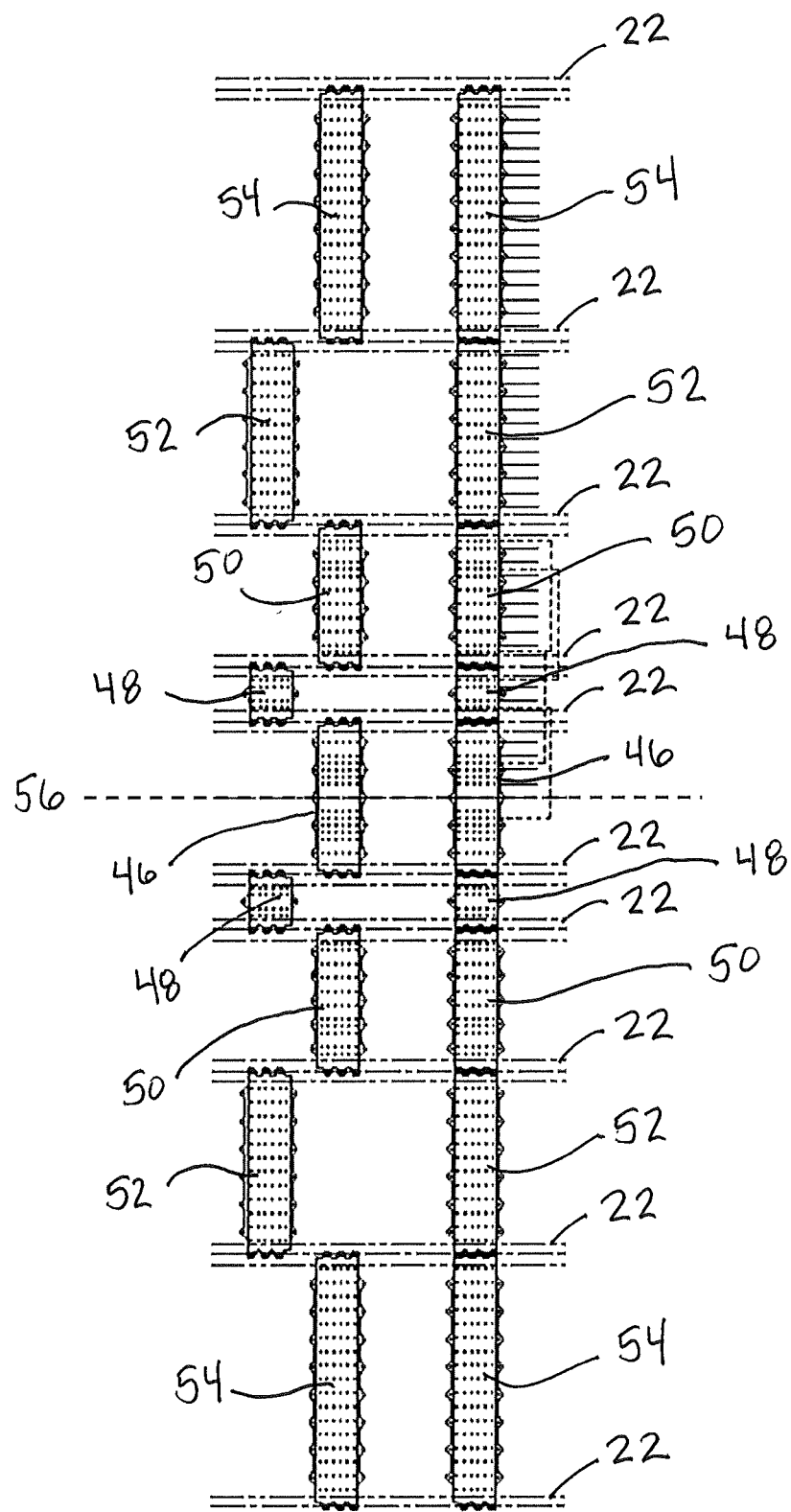
FIG. 6 illustrates an exemplary modular floor track adapter system installation within an aircraft cabin.

FIG. 6 shows an exemplary layout of the floor track adapter system across the full width of an aircraft cabin. The centerline of the aircraft is illustrated at reference numeral 56, and the adapter plates are symmetrically arranged in the outboard direction about the centerline. The span between floor beams 22 generally increases from the centerline outboard. Two center adapter plates 46 straddle the centerline and are spaced apart in the longitudinal direction. In the front row shown on the right side of FIG. 6, the adapter plates are arranged to form one continuous row including, symmetrically from the centerline outboard, a center adapter plate 46, an inboard adapter plate 48, a mid/inboard adapter plate 50, a mid-outboard adapter plate 52, and an outboard adapter plate 54. Left-handed and right-handed versions of each adapter plate are mirror images and may be used on opposite sides of the centerline to allow interlocking with front and rear edge alignment. The center, inboard and mid/inboard adapter plates may include additional holes to increase the available locations for seat track attachment. Certain adapter plates may lack holes in certain locations for seat track attachment due to the location of the adapter plate attachments to the aircraft floor beams.

The same adapter plates are used in the second row, but in the second row the adapter plates are staggered. This arrangement could be used, for example, where the row across the width of the cabin includes alternating seats and furniture and/or partitions, where the seats may require close spacing between front and rear seat tracks and the furniture includes greater spacing between the front and rear seat tracks. From FIG. 6, it is apparent that the system of the present invention is customizable and provides a large degree of installation flexibility, allowing an interior designer to achieve any layout of seats, furniture and monuments within the cabin.

Installation of the adapter plates may require that the aircraft floor panels be cut to accommodate the adapter plates. To simplify the installation process, straight floor panel cuts are preferred. A section of the floor panel commensurate in size with that of the adapter plate may be cut and removed. Each adapter plate has the panel attachment tabs incorporated to mount the floor panels along the newly cut floor panel edge.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A modular floor track adapter system, comprising:
   a plurality of adapter plates each laterally sized to span existing adjacent aircraft floor beams;
   each of the plurality of adapter plates shaped to interlock with an adjacent one of the plurality of adapter plates in a side-by-side arrangement, wherein lateral edges of the adjacent adapter plates interface through interleaved features that prevent relative translational movement therebetween along a longitudinal direction of the aircraft floor beams;
   each of the plurality of adapter plates including a series of vertically-oriented holes disposed inward of the lateral edges thereof for attaching seat track sections thereto; and
   each of the plurality of adapter plates including attachment tabs along a forward edge and a rear edge thereof for securing an aircraft floor panel thereto.

2. The modular floor track adapter system of claim 1, wherein each of the interleaved features has a vertically-oriented opening therethrough for receiving a fastener.

3. The modular floor track adapter system of claim 1, wherein the series of vertically-oriented holes open through a top face of each of the plurality of adapter plates.

4. The modular floor track adapter system of claim 1, wherein the series of vertically-oriented holes extend through a thickness of each of the plurality of adapter plates.

5. The modular floor track adapter system of claim 1, wherein the series of vertically-oriented holes are arranged into parallel rows and parallel columns of holes across a respective length and width of each of the plurality of adapter plates.

6. The modular floor track adapter system of claim 1, wherein the panel attachment tabs located along the front and rear edges of each of the plurality of adapter plates are recessed from a top face of the adapter plate and each include a vertically-oriented opening therethrough.

7. The modular floor track adapter system of claim 1, further comprising sections of seat track adapted to attach to a top face of each of the plurality of adapter plates.

8. The modular floor track adapter system of claim 1, wherein the plurality of adapter plates comprises a group of adapter plates having a common length and varying widths to accommodate variable spacing between the existing adjacent aircraft floor beams.

9. A modular floor track adapter system adapted to be installed over adjacent aircraft floor beams, comprising:
   a plurality of adapter plates each laterally sized to span the adjacent aircraft floor beams, each of the plurality of adapter plates shaped to interlock with a laterally adjacent adapter plate in a side-by-side arrangement wherein lateral edges of adjacent adapter plates interface through interleaved features that prevent relative translational movement therebetween along a longitudinal direction of the adjacent aircraft floor beams, each of the plurality of adapter plates including a series of vertically-oriented holes opening through a top face thereof and panel attachment tabs located along a forward edge and a rear edge thereof for securing an aircraft floor panel thereto; and
   seat track sections adapted to attach to the top face of each of the plurality of adapter plates by way of fasteners received through the seat track sections and the series of vertically-oriented holes.

10. The modular floor track adapter system of claim 9, wherein each of interleaved features has a vertically-oriented opening therethrough for receiving a fastener.

11. The modular floor track adapter system of claim 9, wherein the series of vertically-oriented holes extend through a thickness of each of the plurality of adapter plates and are arranged into parallel rows and parallel columns of holes across a respective length and width of each of the plurality of adapter plates.

12. The modular floor track adapter system of claim 9, wherein the panel attachment tabs are periodically arranged along the front and rear edges of each of the plurality of adapter plates and are recessed from the top face.

13. The modular floor track adapter system of claim 9, wherein the plurality of adapter plates comprises a group of adapter plates having a common length and varying widths to accommodate variable spacing between the adjacent aircraft floor beams.

* * * * *